US012033577B2

(12) United States Patent
Sakai

(10) Patent No.: US 12,033,577 B2
(45) Date of Patent: Jul. 9, 2024

(54) DISPLAY DEVICE AND METHOD FOR DRIVING SAME

(71) Applicant: Sharp Kabushiki Kaisha, Sakai (JP)

(72) Inventor: Tamotsu Sakai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/025,209

(22) PCT Filed: Sep. 14, 2020

(86) PCT No.: PCT/JP2020/034635
§ 371 (c)(1),
(2) Date: Mar. 8, 2023

(87) PCT Pub. No.: WO2022/054266
PCT Pub. Date: Mar. 17, 2022

(65) Prior Publication Data

US 2023/0317002 A1 Oct. 5, 2023

(51) Int. Cl.
*G09G 3/3233* (2016.01)
*G09G 3/32* (2016.01)
(Continued)

(52) U.S. Cl.
CPC ............. *G09G 3/3233* (2013.01); *G09G 3/32* (2013.01); *G09G 3/3225* (2013.01);
(Continued)

(58) Field of Classification Search
CPC ......... G09G 3/3233; G09G 2300/0819; G09G 2310/08; G09G 3/20; G09G 3/3225;
(Continued)

(56) References Cited

U.S. PATENT DOCUMENTS

2012/0050234 A1* 3/2012 Jang ..................... G09G 3/3225 345/204
2012/0127220 A1* 5/2012 Noguchi .............. G09G 3/3233 345/77
(Continued)

FOREIGN PATENT DOCUMENTS

JP 2007-304225 A 11/2007
JP 2009-210904 A 9/2009
(Continued)

OTHER PUBLICATIONS

Official Communication issued in International Patent Application No. PCT/JP2020/034635, mailed on Dec. 1, 2020.

*Primary Examiner* — Douglas M Wilson
(74) *Attorney, Agent, or Firm* — Keating & Bennett, LLP

(57) ABSTRACT

In a display device, a pixel circuit includes a light-emitting element, a drive transistor, a write control transistor provided between a data line and a first conductive terminal of the drive transistor and having a control terminal connected to a scanning line, a threshold compensation transistor provided between the drive transistor's control terminal and second conductive terminal and having a control terminal connected to the scanning line, and an initialization transistor having a first conductive terminal connected to the control terminal of the drive transistor, a second conductive terminal to which an initialization voltage is applied, and a control terminal connected to the control line. A scanning line driver circuit selectively performs operations of selecting the scanning lines in a predetermined order and in a reverse order and, for each scanning signal line, selects the control line that corresponds to the scanning line one horizontal period before the selection of the scanning line. This
(Continued)

renders it possible to initialize voltages at the control terminals of the drive transistors and thereby readily display a screen upside down.

12 Claims, 8 Drawing Sheets

(51) Int. Cl.

*G09G 3/3225* (2016.01)

*G09G 3/36* (2006.01)

(52) U.S. Cl.

CPC ... *G09G 3/3659* (2013.01); *G09G 2300/0426* (2013.01); *G09G 2300/0819* (2013.01); *G09G 2300/0861* (2013.01); *G09G 2310/0283* (2013.01); *G09G 2310/061* (2013.01); *G09G 2310/08* (2013.01)

(58) Field of Classification Search

CPC .................. G09G 3/32; G09G 3/3659; G09G 2300/0426; G09G 2300/0861; G09G 2310/0283; G09G 2310/061

See application file for complete search history.

(56) References Cited

U.S. PATENT DOCUMENTS

| | | | | |
|---|---|---|---|---|
| 2016/0232849 | A1* | 8/2016 | Jeon ..................... | G09G 3/3233 |
| 2018/0130409 | A1 | 5/2018 | Xiang et al. | |
| 2019/0355304 | A1 | 11/2019 | Tanaka et al. | |
| 2021/0066429 | A1* | 3/2021 | Kim ..................... | G09G 3/3266 |

FOREIGN PATENT DOCUMENTS

| | | | |
|---|---|---|---|
| JP | 2012-048186 | A | 3/2012 |
| WO | 2011/013409 | A1 | 2/2011 |
| WO | 2019/053769 | A1 | 3/2019 |

* cited by examiner

DISPLAY DEVICE AND METHOD FOR DRIVING SAME

TECHNICAL FIELD

The disclosure relates to display devices, particularly to a display device that includes pixel circuits incorporating current-driven light-emitting elements.

BACKGROUND ART

In recent years, organic EL display devices that include pixel circuits incorporating organic electro-luminescent (abbreviated below as EL) elements have been put into practical use. In addition to the organic EL elements, the pixel circuits in the organic EL display devices include drive transistors, write control transistors, etc. These transistors are thin-film transistors (referred to below as TFTs). The organic EL elements are current-driven light-emitting elements, which emit light with luminances corresponding to the amount of current flowing therethrough. The drive transistors are provided in series with the organic EL elements to control the amount of current flowing through the organic EL elements.

The drive transistors are prone to variations and shifts in characteristics. Accordingly, in order for the organic EL display devices to achieve high-quality image display, it is necessary to compensate for variations and shifts in the characteristics of the drive transistors. For the organic EL display devices, there are known compensation methods in which the characteristics of the drive transistors are compensated for within the pixel circuits (internal compensation) or outside the pixel circuits (external compensation). In the case of an organic EL display device that performs internal compensation, the pixel circuits each include an initialization transistor for initializing the drive transistor's gate voltage.

There are various known pixel circuits for the organic EL display devices. FIG. 11 is a circuit diagram of a pixel circuit in a known organic EL display device. The pixel circuit 90 shown in FIG. 11 includes a TFT Q4 functioning as a drive transistor and a TFT Q1 functioning as an initialization transistor. When a voltage is written to the pixel circuit 90, a scanning line Gi is selected and controlled to have a low-level voltage. At this time, TFTs Q2, Q3, and Q7 are turned on. To initialize the gate voltage of the TFT Q4 before the voltage is written to the pixel circuit 90, the TFT Q1 is connected at a gate terminal to a scanning line Gi−1, which is selected one horizontal period earlier than the scanning line Gi.

To use such an organic EL display device in various forms, the organic EL display device preferably has, in addition to the function of displaying a normal screen, the function of displaying the screen upside down. To display the screen upside down, it is necessary for a scanning line driver circuit to drive scanning lines in the opposite order to normal. Such organic EL display devices that switch the direction of scanning and thereby display the screen upside down are described in, for example, Patent Documents 1 and 2.

CITATION LIST

Patent Documents

Patent Document 1: Japanese Laid-Open Patent Publication No. 2007-304225

Patent Document 2: Japanese Laid-Open Patent Publication No. 2012-48186

SUMMARY

Technical Problem

Consider the case where the organic EL display device that includes the pixel circuits 90 as shown in FIG. 11 displays the screen upside down. In the pixel circuit 90, the gate terminal of the TFT Q1 is connected to the scanning line Gi−1. Accordingly, when the organic EL display device that includes the pixel circuits 90 drives the scanning lines in the opposite order to normal, the gate voltage of the TFT Q4 is initialized after a voltage is written to the pixel circuit 90. As a result, the organic EL display device that includes the pixel circuits 90 has difficulty in displaying the screen upside down.

Therefore, a problem to be solved is to provide a display device capable of initializing voltages at control terminals of drive transistors and thereby readily displaying a screen upside down.

Solution to Problem

The above problem can be solved, for example, by a display device including: a display portion including a plurality of scanning lines, a plurality of control lines, a plurality of data lines, and a plurality of pixel circuits; a scanning line driver circuit configured to drive the scanning lines and the control lines; and a data line driver circuit configured to drive the data lines. Each of the pixel circuits includes: a light-emitting element; a drive transistor provided in series with the light-emitting element to control an amount of current flowing through the light-emitting element; a write control transistor provided between one of the data lines and a first conductive terminal of the drive transistor and having a control terminal connected to one of the scanning lines; a threshold compensation transistor provided between the drive transistor's control terminal and second conductive terminal and having a control terminal connected to the one of the scanning lines; and an initialization transistor having a first conductive terminal connected to the control terminal of the drive transistor, a second conductive terminal to which an initialization voltage is applied, and a control terminal connected to one of the control lines. The scanning line driver circuit selectively performs an operation of selecting the scanning lines in a predetermined order and an operation of selecting the scanning lines in a reverse order and, for each scanning line, selects the control line that corresponds to the each scanning line one horizontal period before the selection of the each scanning line.

The above problem can also be solved by a method for driving a display device having a display portion that includes a plurality of scanning lines, a plurality of control lines, a plurality of data lines, and a plurality of pixel circuits. Each of the pixel circuits includes a light-emitting element, a drive transistor provided in series with the light-emitting element to control an amount of current flowing through the light-emitting element, a write control transistor provided between one of the data lines and a first conductive terminal of the drive transistor and having a control terminal connected to one of the scanning line, a threshold compensation transistor provided between the drive transistor's control terminal and second conductive terminal and having a control terminal connected to the one of the scanning lines, and an initialization transistor having a first conductive terminal connected to the control terminal of the drive transistor, a second conductive terminal to which an initialization voltage is applied, and a control terminal connected to one of the control lines. The method includes selectively performing an operation of selecting the scanning lines in a predetermined order and an operation of selecting the scanning lines in a reverse order; for each scanning line, selecting the control line that corresponds to the each scanning line one horizontal period before the selection of the each scanning line; and driving the data lines.

Effect of the Disclosure

In the above display device and the method for driving the same, the control lines, which are connected to the control terminals of the initialization transistors, are provided in addition to the scanning lines, which are connected to the control terminals of the write control transistors and the control terminals of the threshold compensation transistors. Accordingly, regardless of the direction of scanning, voltages at the control terminals of the drive transistors can be initialized before voltages are written to the pixel circuits, by, for each scanning line, selecting the control line that corresponds to the each scanning line one horizontal period before the selection of the each scanning line. The initializing of the voltages at the control terminals of the drive transistors renders it possible to readily display a screen upside down.

DESCRIPTION OF EMBODIMENTS

First Embodiment

Figure 1:
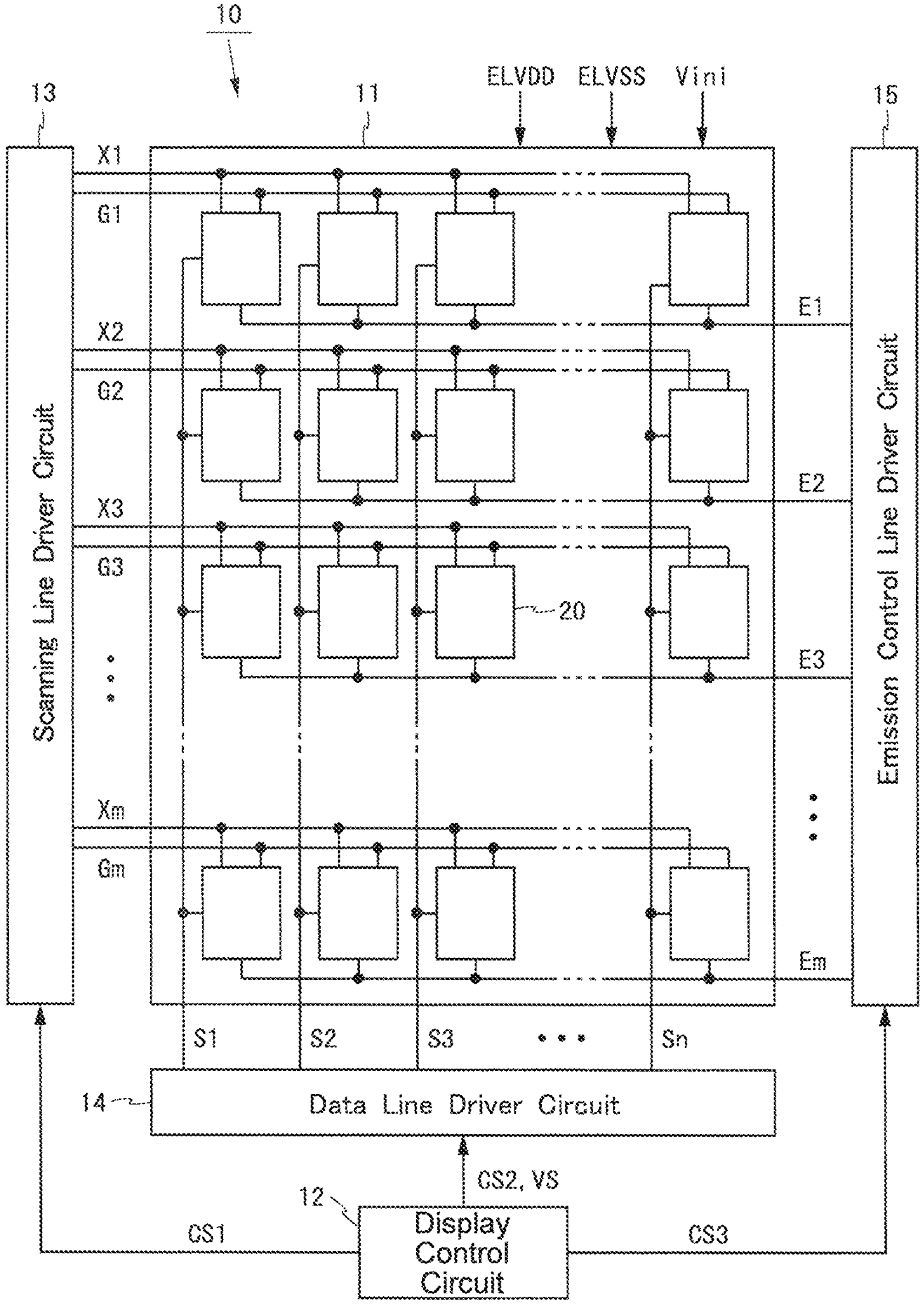
FIG. 1 is a block diagram illustrating the configuration of an organic EL display device according to a first embodiment.

FIG. 1 is a block diagram illustrating the configuration of an organic EL display device according to a first embodiment. The organic EL display device 10 shown in FIG. 1 includes a display portion 11, a display control circuit 12, a scanning line driver circuit 13, a data line driver circuit 14, and an emission control line driver circuit 15. In the following, the horizontal and vertical directions in figures will be referred to as the row and column directions, respectively. Moreover, m and n are integers of 2 or more, i is an integer from 1 to m, and j is an integer from 1 to n.

The display portion 11 includes m scanning lines G1 to Gm, m control lines X1 to Xm, n data lines S1 to Sn, m emission control lines E1 to Em, and (m×n) pixel circuits 20. The scanning lines G1 to Gm extend in the row direction so as to be parallel to one another. The data lines S1 to Sn extend in the column direction so as to be parallel to one another and perpendicular to the scanning lines G1 to Gm. The control lines X1 to Xm and the emission control lines E1 to Em extend in the row direction so as to be parallel to the scanning lines G1 to Gm. The scanning lines G1 to Gm and the data lines S1 to Sn cross each other at (mXn) points. The (mXn) pixel circuits 20 are arranged in a two-dimensional matrix corresponding to the crossing points of the scanning lines G1 to Gm and the data lines S1 to Sn. Each pixel circuit 20 is supplied with a high-level power supply voltage ELVDD, a low-level power supply voltage ELVSS, and an initialization voltage Vini through unillustrated wiring lines.

The display control circuit 12 outputs a control signal CS1 to the scanning line driver circuit 13, a control signal CS2 and video signals VS to the data line driver circuit 14, and a control signal CS3 to the emission control line driver circuit 15. The scanning line driver circuit 13 drives the scanning lines G1 to Gm and the control lines X1 to Xm based on the control signal CS1. The data line driver circuit 14 drives the data lines S1 to Sn based on the control signal CS2 and the video signals VS. The emission control line driver circuit 15 drives the emission control lines E1 to Em based on the control signal CS3.

The scanning line driver circuit 13 sequentially selects the scanning lines G1 to Gm one by one based on the control signal CS1, and provides the scanning line that is being selected with a voltage that turns on TFTs in the pixel circuits 20 (the voltage is low level here and will be referred to below as the on voltage), thereby collectively selecting the n pixel circuits 20 connected to the scanning line that is being selected. The data line driver circuit 14 provides the data lines S1 to Sn with n respective voltages corresponding to the video signals VS (referred to below as data voltages) based on the control signal CS2. As a result, the n data voltages are written to the n respective pixel circuits 20 that are being selected.

Each row of pixel circuits 20 are assigned emission and non-emission periods. During the emission period for the i'th-row pixel circuits 20, the emission control line driver circuit 15 applies the on voltage to the emission control line Ei. During the non-emission period for the i'th-row pixel circuits 20, the emission control line driver circuit 15 provides the emission control line Ei with a voltage that turns off the TFTs in the pixel circuits 20 (the voltage is high level here). During the emission period for the i'th-row pixel circuits 20, organic EL elements in the i'th-row pixel circuits 20 emit light with luminances corresponding to the data voltages written in the pixel circuits 20.

For each scanning line Gi to be selected, based on the control signal CS1, the scanning line driver circuit 13 selects the control line Xi that corresponds to the scanning line Gi one horizontal period before the selection of the scanning line Gi, and applies the on voltage to the control line Xi that is being selected, thereby initializing gate voltages of drive transistors in the n pixel circuits 20 that are connected to the control line Xi.

Figure 2:
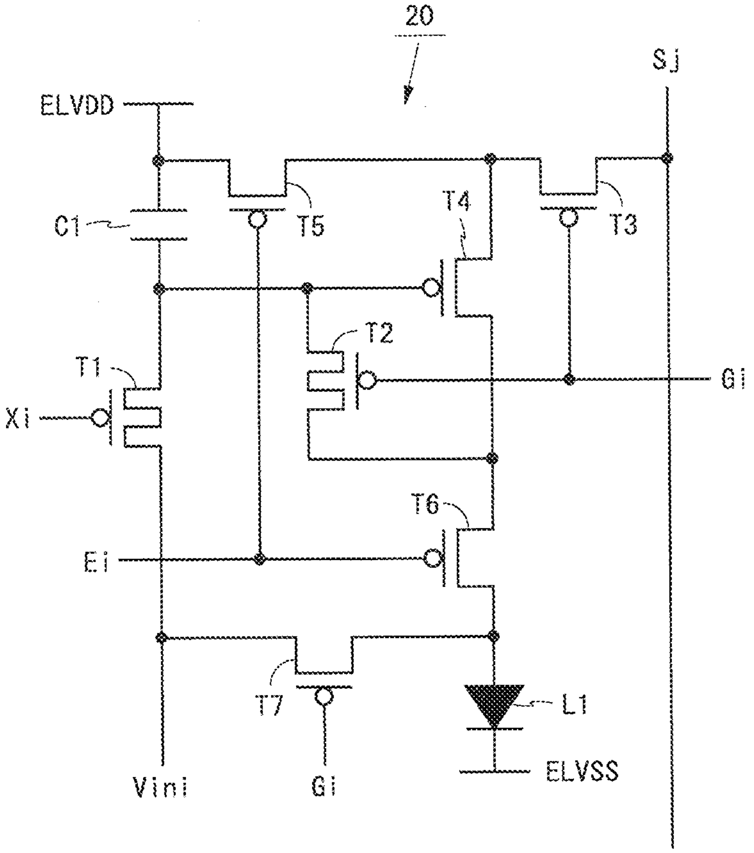
FIG. 2 is a circuit diagram of a pixel circuit in the organic EL display device shown in FIG. 1.

FIG. 2 is a circuit diagram of the pixel circuit 20. The pixel circuit 20 shown in FIG. 2 is the i'th-row, j'th-column pixel circuit 20. The pixel circuit 20 shown in FIG. 2 includes seven TFTs T1 to T7, an organic EL element L1, and a capacitor C1. The TFTs T1 to T7 are P-channel transistors. The TFTs T1 and T2 are double-gate TFTs, each having two gate terminals. The pixel circuit 20 is connected to the scanning line Gi, the control line Xi, the data line Sj, and the emission control line Ei.

The high-level power supply voltage ELVDD is applied to a source terminal of the TFT T5 and a first electrode (in FIG. 2, upper electrode) of the capacitor C1. The TFT T3 is connected to the data line Sj at a source terminal. The TFTs T3 and T5 are connected to a source terminal of the TFT T4 at respective drain terminals. The TFT T4 is connected to source terminals of the TFTs T2 and T6 at a drain terminal. The TFT T6 is connected at a drain terminal to an anode terminal of the organic EL element L1 and a source terminal of the TFT T7. The low-level power supply voltage ELVSS is applied to a cathode terminal of the organic EL element L1. The TFT T2 is connected at a drain terminal to a gate terminal of the TFT T4, a second electrode of the capacitor C1, and a source terminal of the TFT T1. The initialization voltage Vini is applied to drain terminals of the TFTs T1 and T7. The TFT T1 is connected to the control line Xi at gate terminals. The TFTs T2, T3, and T7 are connected to the scanning line Gi at respective gate terminals. The TFTs T5 and T6 are connected to the emission control line Ei at respective gate terminals.

In the pixel circuit 20, the organic EL element L1 functions as a current-driven light-emitting element. The TFT T4 is provided in series with the light-emitting element and functions as a drive transistor to control the amount of current flowing through the light-emitting element. The TFT T3 is provided between the data line Sj and a first conductive terminal of the drive transistor and functions as a write control transistor with a control terminal connected to the scanning line Gi. The TFT T2 is provided between the drive transistor's control terminal and second conductive terminal and functions as a threshold compensation transistor with a control terminal connected to the scanning line Gi. The TFT T1 functions as an initialization transistor with a first conductive terminal connected to the control terminal of the drive transistor, a second conductive terminal to which the initialization voltage Vini is applied, and a control terminal connected to the control line Xi. The TFT T7 functions as a second initialization transistor with a first conductive terminal connected to the anode terminal of the light-emitting element, a second conductive terminal to which the initialization voltage Vini is applied, and a control terminal connected to the scanning line Gi. The TFTs T5 and T6 are provided on a current path passing by way of the drive transistor and the light-emitting element, and function as emission control transistors with control terminals connected to the emission control line Ei.

It should be noted that the TFTs included in the pixel circuit 20 may be amorphous silicon transistors with channel layers formed of amorphous silicon, low-temperature polysilicon transistors with channel layers formed of low-temperature polysilicon, or oxide semiconductor transistors with channel layers formed of oxide semiconductor. An example of the oxide semiconductor is indium gallium zinc oxide (IGZO). Moreover, the TFTs included in the pixel circuit 20 may be of a top-gate type or a bottom-gate type. Further, the pixel circuit 20, which includes P-channel transistors, may be replaced by a pixel circuit that includes N-channel transistors. In the case where the pixel circuit includes N-channel transistors, the signals and power supply voltages that are to be supplied to the pixel circuit are inverted in polarity.

Figure 3:
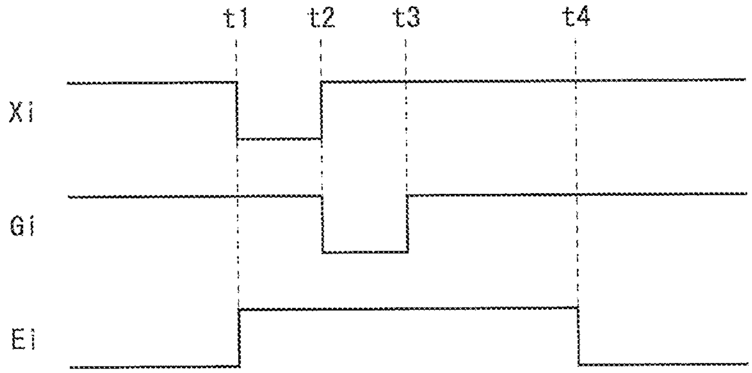
FIG. 3 is a timing chart for the pixel circuit shown in FIG. 2.

FIG. 3 is a timing chart for the pixel circuit 20. Before time t1, the scanning line Gi and the control line Xi have a high-level voltage, and the emission control line Ei has a low-level voltage. Accordingly, the TFTs T1 to T3 and T7 are in an off state, and the TFTs T5 and T6 are in an on state. At this time, if the TFT 14 has a gate-source voltage less than or equal to a threshold voltage of the TFT T4, a current flows from the line that has the high-level power supply voltage ELVDD to the line that has the low-level power supply voltage ELVSS by way of the TFT T5, the TFT T4, the TFT T6, and the organic EL element L1, with the result that the organic EL element L1 emits light with a luminance corresponding to the amount of current flowing therethrough.

At time t1, the voltage on the control line Xi transitions to low level, and the voltage on the emission control line Ei transitions to high level. Correspondingly, the TFT T1 is turned on, and the TFTs T5 and T6 are turned off. As the result of the TFTs T5 and T6 being turned off, no current flows through the organic EL element L1 after time t1, and hence the organic EL element L1 emits no light. As the result of the TFT T1 being turned on, the gate voltage of the TFT T4 becomes equal to the initialization voltage Vini. The level of the initialization voltage Vini is set so low that the TFT 14 is turned on immediately after the voltage on the scanning line Gi transitions to low level (i.e., immediately after time t2).

Next, at time t2, the voltage on the control line Xi transitions to high level, and the voltage on the scanning line Gi transitions to low level. Correspondingly, the TFT T1 is turned off, and the TFTs T2, T3, and T7 are turned on. As a result of the TFT T7 being turned on, the voltage at the anode terminal of the organic EL element L1 becomes equal to the initialization voltage Vini. As a result of the TFT T2 being turned on, the TFT 14 becomes diode-connected. Accordingly, a current flows from the data line Sj to the gate terminal of the TFT 14 by way of the TFT T3, the TFT 14, and the TFT T2, resulting in an increase in the gate voltage of the TFT 14. The current stops flowing when the gate-source voltage of the TFT 14 becomes equal to the threshold voltage of the TFT 14. Assuming that the threshold voltage of the TFT 14 is Vth (<0), and that the data voltage that is applied to the data line Sj during the period from time t2 to time t3 is Vd, the gate voltage of the TFT 14 immediately before time t3 is (Vd−|Vth|).

Next, at time t3, the voltage on the scanning line Gi transitions to high level. Correspondingly, the TFTs T2, T3, and T7 are turned off. After time t3, the capacitor C1 retains an interelectrode voltage (ELVDD—Vd+|Vth|).

Next, at time t4, the voltage on the emission control line Ei transitions to low level. Correspondingly, the TFTs T5 and T6 are turned on. After time t4, a current flows from the line that has the high-level power supply voltage ELVDD to the line that has the low-level power supply voltage ELVSS by way of the TFT T5, the TFT 14, the TFT T6, and the organic EL element L1. By the operation of the capacitor C1, the gate-source voltage Vgs of the TFT 14 is retained at (ELVDD—Vd+|Vth|). Accordingly, the current Id that flows through the organic EL element L1 after time t4 is given by the following equation (1) using a constant K.

$$\begin{aligned} Id &= K(Vgs - |Vth|)^2 \\ &= K(ELVDD - Vd + |Vth| - |Vth|)^2 \\ &= K(ELVDD - Vd)^2 \end{aligned} \tag{1}$$

After time t4, the organic EL element L1 emits light with a luminance corresponding to the data voltage Vd written in the pixel circuit 20, regardless of the threshold voltage Vth of the TFT T4.

The scanning line driver circuit 13 has the function of switching the direction of scanning. More specifically, the scanning line driver circuit 13 selectively performs the operations of selecting the scanning lines G1 to Gm in ascending order (referred to below as "forward scanning") and in descending order (referred to below as "backward scanning"), based on the control signal CS1. In addition, for each scanning line Gi, the scanning line driver circuit 13 selects the control line Xi that corresponds to the scanning line Gi one horizontal period before the selection of the scanning line Gi. The emission control line driver circuit 15 switches between modes of driving the emission control lines E1 to Em, in accordance with the direction of scanning.

Figure 4:
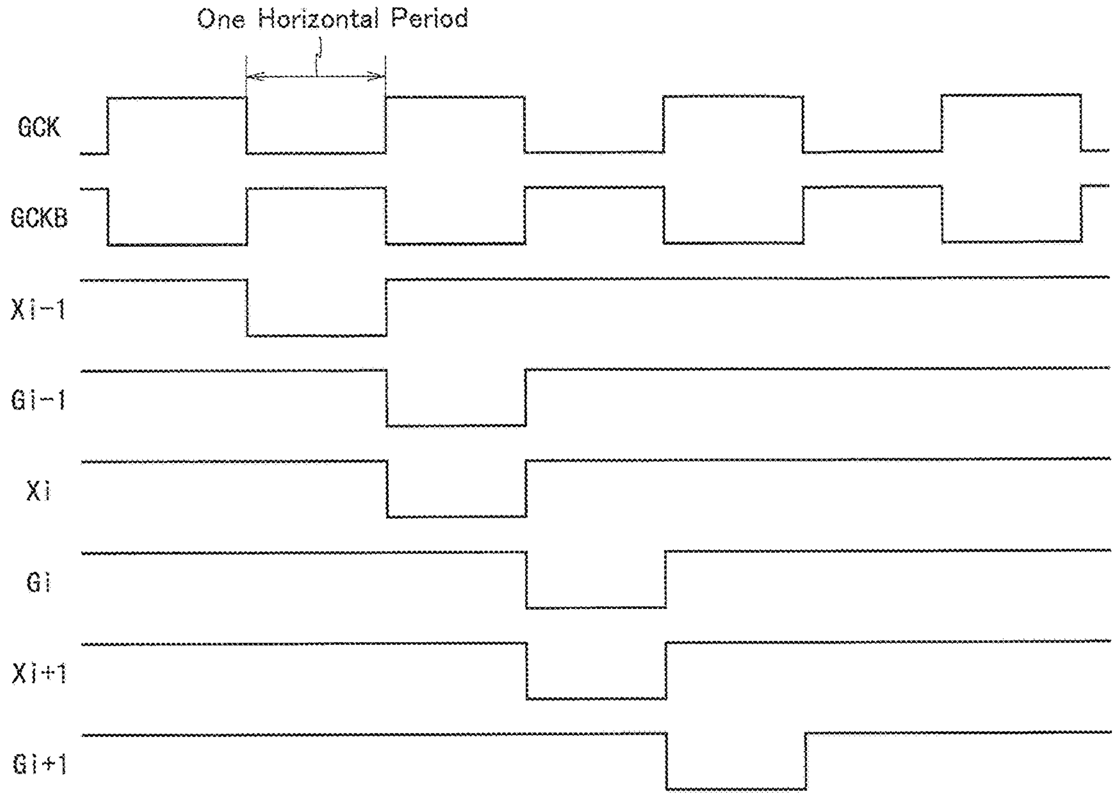
FIG. 4 is a timing chart for the case where a scanning line driver circuit in the organic EL display device shown in FIG. 1 performs forward scanning.
Figure 5:
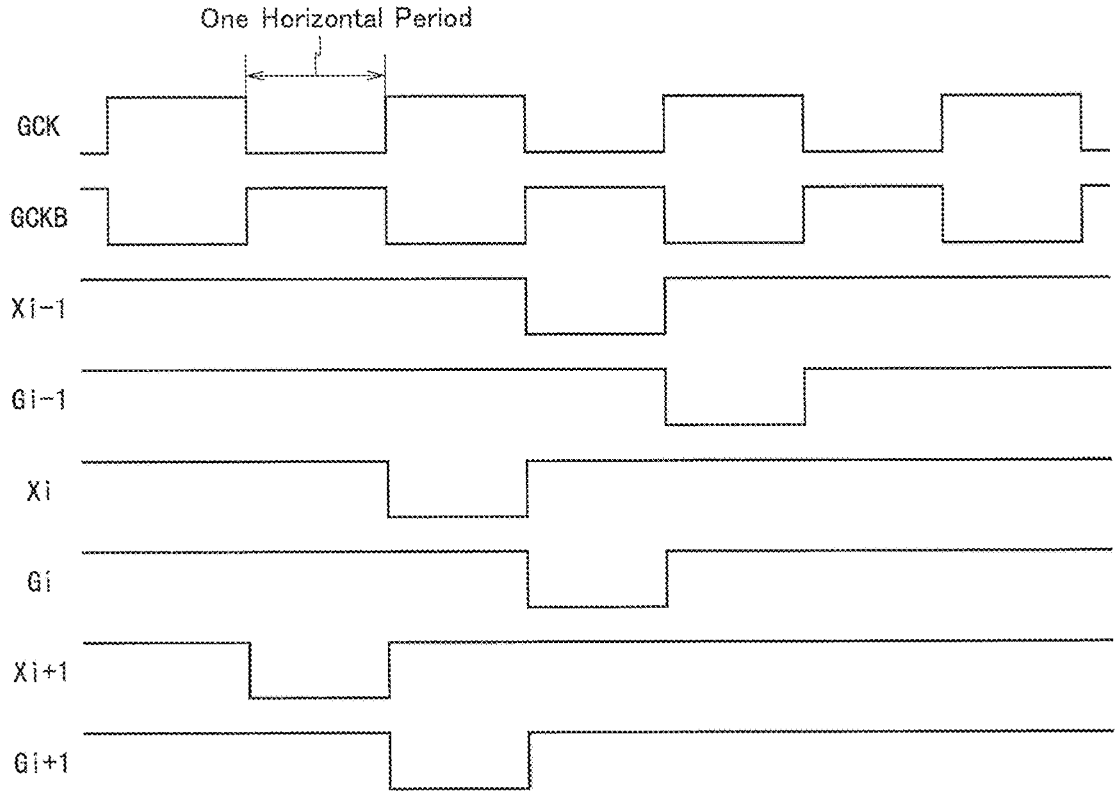
FIG. 5 is a timing chart for the case where the scanning line driver circuit in the organic EL display device shown in FIG. 1 performs backward scanning.

FIG. 4 is a timing chart for the case where the scanning line driver circuit 13 performs forward scanning. FIG. 5 is a timing chart for the case where the scanning line driver circuit 13 performs backward scanning. The control signal CS1, which is outputted to the scanning line driver circuit 13, includes two gate clocks GCK and GCKB, a gate start pulse (not shown), and a control signal that specifies the direction of scanning (not shown). The gate clock GCKB is an inverted signal of the gate clock GCK. The gate clocks GCK and GCKB have a cycle of two horizontal periods.

During forward scanning (FIG. 4), the scanning line driver circuit 13 selects the scanning lines G1 to Gm in ascending order and controls the voltage on the scanning line that is being selected to be set at low level for one horizontal period. Accordingly, the voltage on each of the scanning lines G1 to Gm is set at low level for one horizontal period in the order: G1, G2, . . . , Gi−1, Gi, Gi+1, . . . , Gm−1, Gm. In addition, for each scanning line Gi, the scanning line driver circuit 13 selects the control line Xi that corresponds to the scanning line Gi one horizontal period before the selection of the scanning line Gi, and controls the voltage on the control line Xi that is being selected to be set at low level for one horizontal period. Accordingly, the voltage on the control line Xi is set to low level one horizontal period earlier than the voltage on the scanning line Gi.

During backward scanning (FIG. 5), the scanning line driver circuit 13 selects the scanning lines G1 to Gm in descending order and controls the voltage on the scanning line that is being selected to be set at low level for one horizontal period. Accordingly, the voltage on each of the scanning lines G1 to Gm is set at low level for one horizontal period in the order: Gm, Gm−1, . . . , Gi+1, Gi, Gi−1, . . . , G2, G1. In addition, for each scanning line Gi, the scanning line driver circuit 13 selects the control line Xi that corresponds to the scanning line Gi one horizontal period before the selection of the scanning line Gi, and controls the voltage on the control line Xi that is being selected to be set at low level for one horizontal period. Accordingly, during backward scanning also, the voltage on the control line Xi is set to low level one horizontal period earlier than the voltage on the scanning line Gi.

The scanning line driver circuit 13 includes a shift register configured by cascading m unit circuits (not shown) in stages. The scanning line driver circuit 13 may be configured arbitrarily so long as the scanning lines G1 to Gm and the control lines X1 to Xm can be driven as shown in FIGS. 4 and 5. The scanning line driver circuit 13 may include one or two shift registers for driving the scanning lines G1 to Gm and the control lines X1 to Xm.

In the organic EL display device 10, the voltages on the control lines Xi are set to low level one horizontal period earlier than the voltages on the scanning line Gi, regardless of the direction of scanning. Accordingly, the gate voltage of the TFT T4 is always initialized before the data voltage is written to the pixel circuit 20. Thus, the organic EL display device 10 renders it possible to readily display a screen upside down using the pixel circuits 20 with the TFTs T4 whose gate voltages need to be initialized.

Figure 6:
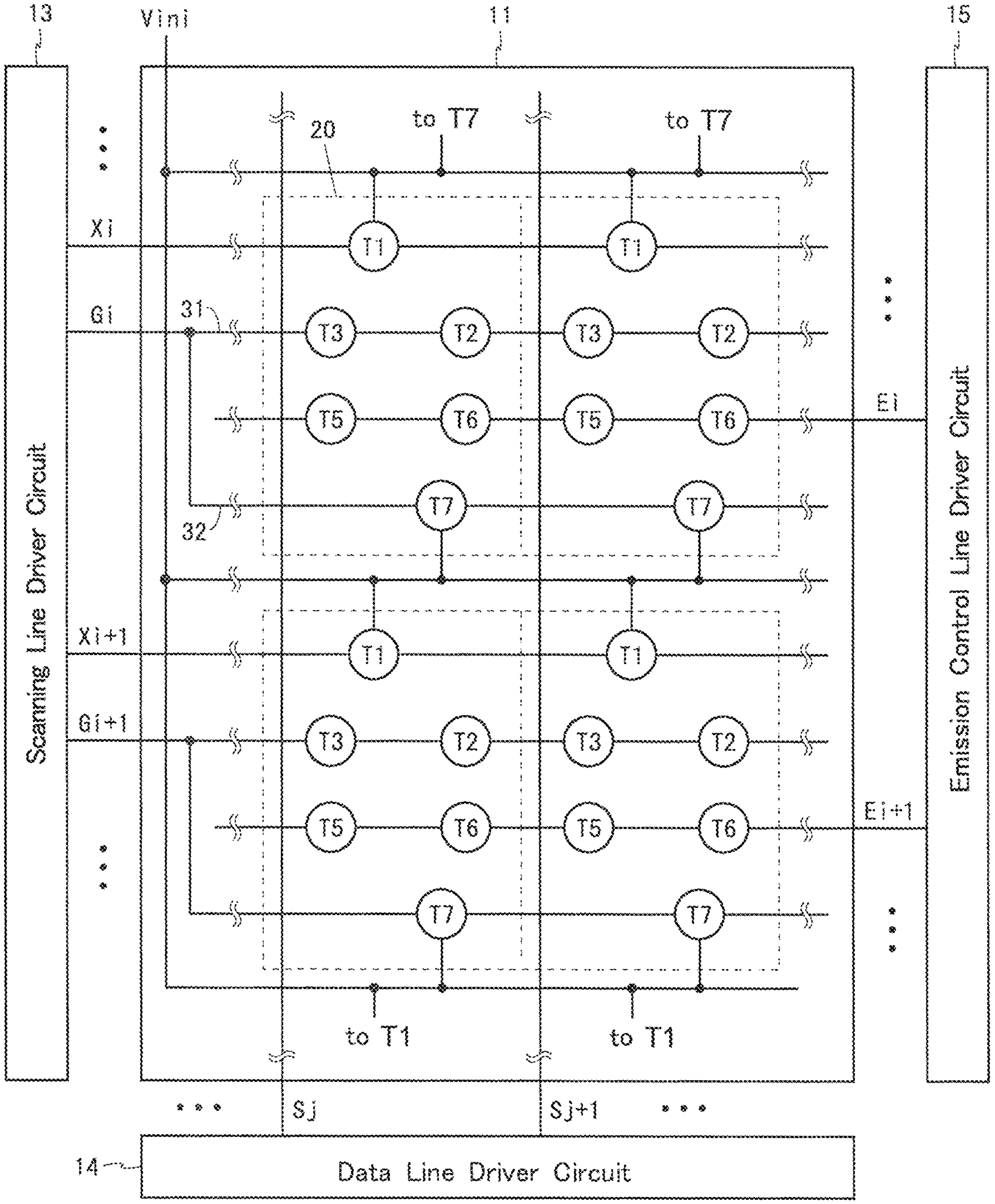
FIG. 6 is a diagram illustrating a wiring configuration in a display portion of the organic EL display device shown in FIG. 1.

Hereinafter, the layout of the pixel circuit 20 will be described. FIG. 6 is a diagram illustrating a wiring configuration in the display portion 11. In FIG. 6, circles represent the TFTs in the pixel circuits 20, line segments that extend in the row direction through the circles represent wiring lines connected to the gate terminals of the TFTs, and line segments that extend in the column direction and connected to some of the circles represent wiring lines connected to the drain terminals of the TFTs. For example, in the i'th-row pixel circuits 20, the TFTs T1 are connected to the control line Xi at the gate terminals and supplied with the initialization voltage Vini at the drain terminals.

The scanning line Gi is depicted as a single wiring line in FIG. 1, but more specifically, the scanning line Gi branches into a first wiring line 31 and a second wiring line 32 in the display portion 11 (see FIG. 6). In the pixel circuit 20, the scanning line Gi is connected to the gate terminals of the TFTs T2, T3, and T7. Of these gate terminals, the gate terminals of the TFTs T2 and T3 are connected to the first wiring line 31, and the gate terminal of the TFT T7 is connected to the second wiring line 32. The reason for this is that when the scanning line Gi is connected to the gate terminals of the TFTs T2, T3, and T7 without being branched, the pixel circuit 20 is required to have contacts and wiring lines extending in the column direction within the pixel circuit 20, resulting in an increased layout area of the pixel circuit 20.

For the i'th-row and (i+1)'th-row pixel circuits 20, there is provided a wiring line having the initialization voltage Vini. This wiring line is connected to the drain terminals of the TFTs T7 in the i'th row pixel circuits 20 and the drain terminals of the TFTs T1 in the (i+1)'th-row pixel circuits 20.

Figure 7:
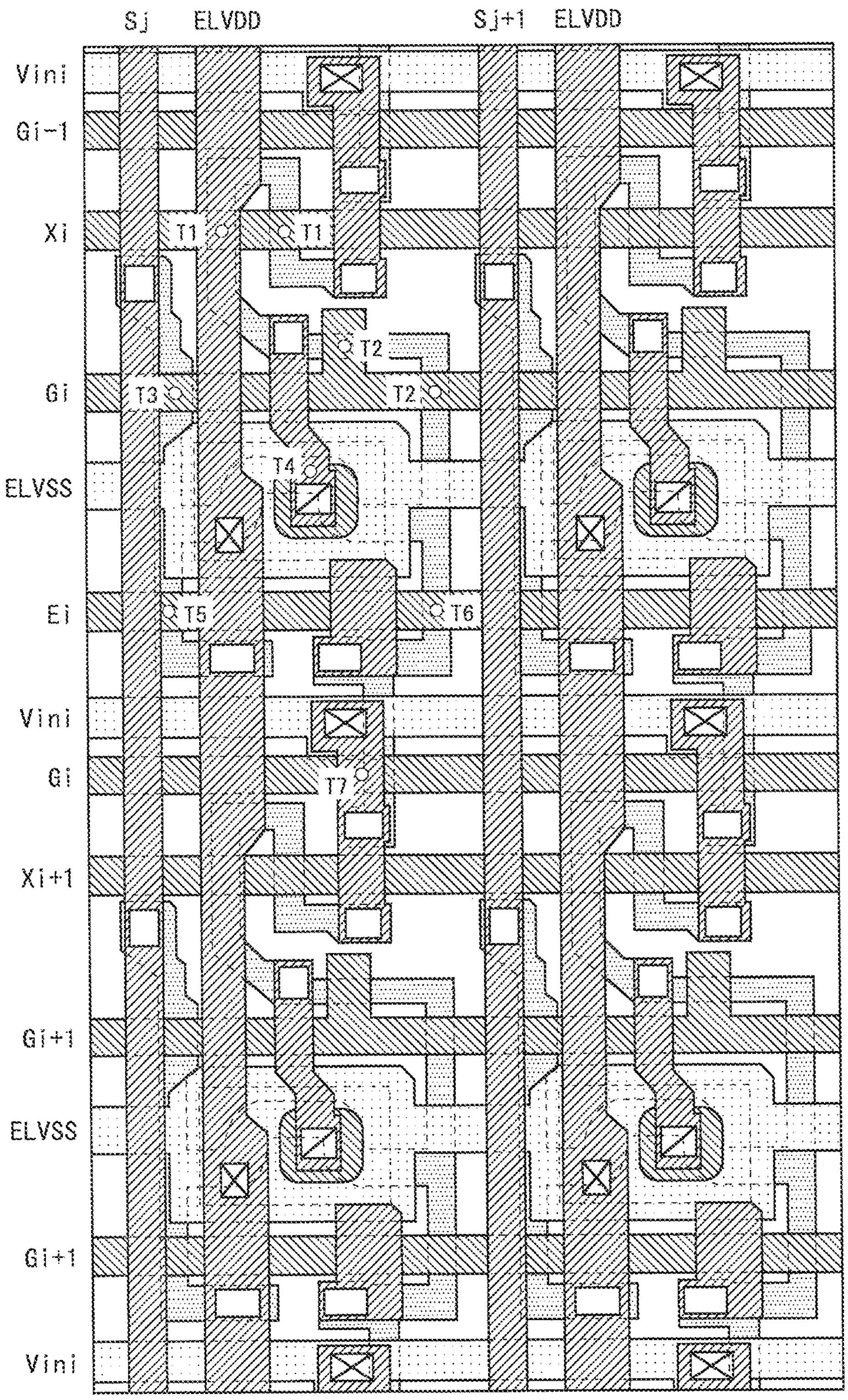
FIG. 7 is a layout diagram of the pixel circuit in the organic EL display device shown in FIG. 1.

FIG. 7 is a layout diagram of the pixel circuit 20. FIG. 7 shows patterns of, from bottom, a semiconductor layer (high-density dot pattern), a gate wiring layer (hatched with lines sloping downwards to the right), an intermediate wiring layer (low-density dot pattern), and a source wiring layer (hatched with lines sloping downwards to the left). Blank rectangles represent contacts that connect the semiconductor layer and the source wiring layer. Rectangles with a diagonal line represent contacts that connect the gate wiring layer and the source wiring layer. Rectangles with crossed diagonal lines represent contacts that connect the intermediate wiring layer and the source wiring layer. Circles indicate the locations of gate electrodes of the TFTs T1 to T7. Note that neither patterns for overlying wiring layers above the source wiring layer nor contacts that connect the overlying wiring layers and other wiring layers are shown.

Figure 8:
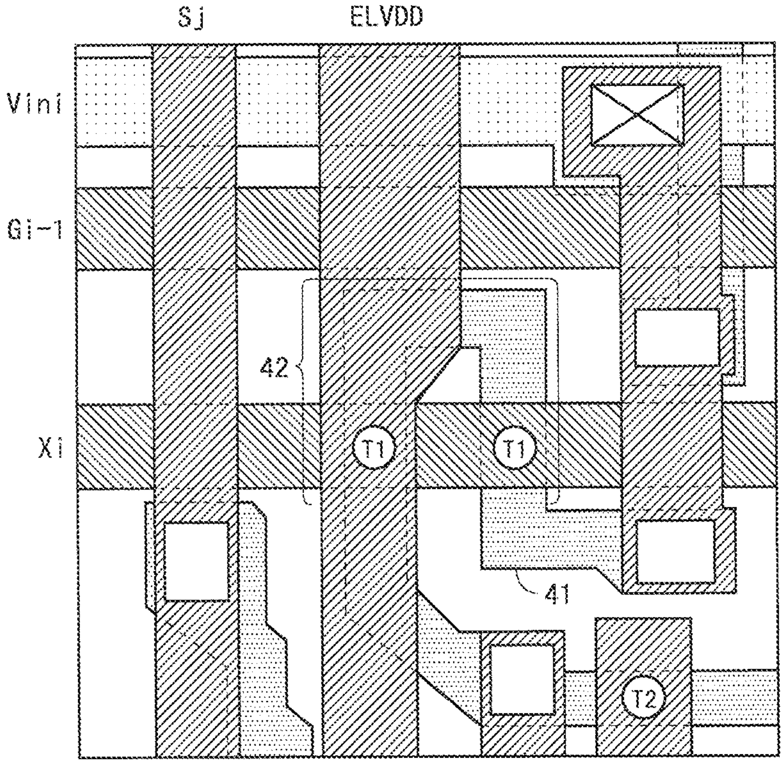
FIG. 8 is an enlarged view from FIG. 7.

FIG. 8 is an enlarged view from FIG. 7. FIG. 8 illustrates the layout of a portion surrounding the TFT T1. As shown in FIG. 8, the control line Xi extends in the row direction. The semiconductor layer pattern 41 has a U-shaped bent part 42 provided at the location where the TFT T1 is formed, and the bent part 42 crosses the control line Xi at two locations. The portions of the control line Xi that cross the bent part 42 function as the gate electrodes of the TFT T1. In this manner, the TFT T1 has two gate electrodes formed at the locations where the control line Xi and the bent part 42 cross each other.

As described above, the organic EL display device according to the present embodiment includes the display portion 11, including the scanning lines G1 to Gm, the control lines X1 to Xm, the data lines S1 to Sn, and the pixel circuits 20, the scanning line driver circuit 13 configured to drive the scanning lines G1 to Gm and the control lines X1 to Xm, and the data line driver circuit 14 configured to drive the data lines S1 to Sn. The pixel circuit 20 includes the light-emitting element (organic EL element L1), the drive transistor (TFT T4) provided in series with the light-emitting element to control the amount of current flowing through the light-emitting element, the write control transistor (TFT T3) provided between the data line Sj and the first conductive terminal (source terminal) of the drive transistor and having the control terminal (gate terminal) connected to the scanning line Gi, the threshold compensation transistor (TFT T2) provided between the drive transistor's control terminal and second conductive terminal (drain terminal) and having the control terminal connected to the scanning line Gi, and the initialization transistor (TFT T1) having the first conductive terminal connected to the control terminal of the drive transistor, the second conductive terminal to which the initialization voltage Vini is applied, and the control terminal connected to the control line Xi. The scanning line driver circuit 13 selectively performs the operation of selecting the scanning lines G1 to Gm in a predetermined order (forward scanning) and the operation of selecting the scanning lines G1 to Gm in a reverse order (backward scanning), and, for each scanning line Gi, selects the control line Xi that corresponds to the scanning line Gi one horizontal period before the selection of the scanning line Gi.

In the organic EL display device 10 according to the present embodiment, the control lines Xi, which are connected to the control terminals of the initialization transistors, are provided in addition to the scanning lines Gi, which are connected to the control terminals of the write control transistors and the control terminals of the threshold compensation transistors. Accordingly, regardless of the direction of scanning, voltages at the control terminals of the drive transistors can be initialized before voltages (data voltages) are written to the pixel circuits 20, by, for each scanning line Gi, selecting the control line Xi that corresponds to the scanning line Gi one horizontal period before the selection of the scanning line. The initializing of the voltages at the control terminals of the drive transistors renders it possible to readily display a screen upside down.

The initialization transistor has two gate terminals serving as the control terminal. Accordingly, it is possible to reduce leakage current from the control terminal of the drive transistor and thereby suppress voltage variations at the control terminal of the drive transistor. The control line Xi extends in a predetermined direction (row direction). The semiconductor layer of the initialization transistor (i.e., the portion of the semiconductor layer pattern 41 that coincides with the location of the TFT T1) has the U-shaped bent part 42 crossing the control line Xi at two locations. The initialization transistor has the two gate electrodes formed at the locations where the control line Xi and the bent part 42 cross each other (FIG. 8). Thus, the initialization transistor can be formed so as to have two gate terminals.

The pixel circuit 20 further includes the second initialization transistor (TFT T7) having the first conductive terminal connected to the anode terminal of the light-emitting element, the second conductive terminal to which the initialization voltage Vini is applied, and the control terminal connected to the scanning line Gi. Accordingly, when a voltage is written to the pixel circuit 20, the voltage at the anode terminal of the light-emitting element can be initialized. The scanning line Gi branches into the first wiring line 31 and the second wiring line 32 in the display portion 11. The first wiring line 31 is connected to the control terminal of the write control transistor and the control terminal of the threshold compensation transistor. The second wiring line 32 is connected to the control terminal of the second initialization transistor. The connecting of the control terminals of the three transistors to the two separate wiring lines renders it possible to prevent an increase in the layout area of the pixel circuit 20.

The display portion 11 further includes the emission control lines E1 to Em. The pixel circuit 20 further includes one or more emission control transistors (TFTs T5 and T6) provided on the current path passing by way of the drive transistor and the light-emitting element (i.e., the current path passes by way of the TFT T5, the TFT T4, the TFT T6, and the organic EL element L1). Each emission control transistor has a control terminal connected to the emission control line Ei. Providing the pixel circuit 20 with the emission control transistor(s) allows the light-emitting element to emit light at suitable times.

Second Embodiment

An organic EL display device according to a second embodiment has the same configuration as the organic EL display device according to the first embodiment and operates in the same manner as the organic EL display device according to the first embodiment (see FIGS. 1 to 6). The organic EL display device according to the present embodiment differs from the organic EL display device 10 according to the first embodiment only in the layout of the pixel circuit 20. Differences from the first embodiment will be described below.

Figure 9:
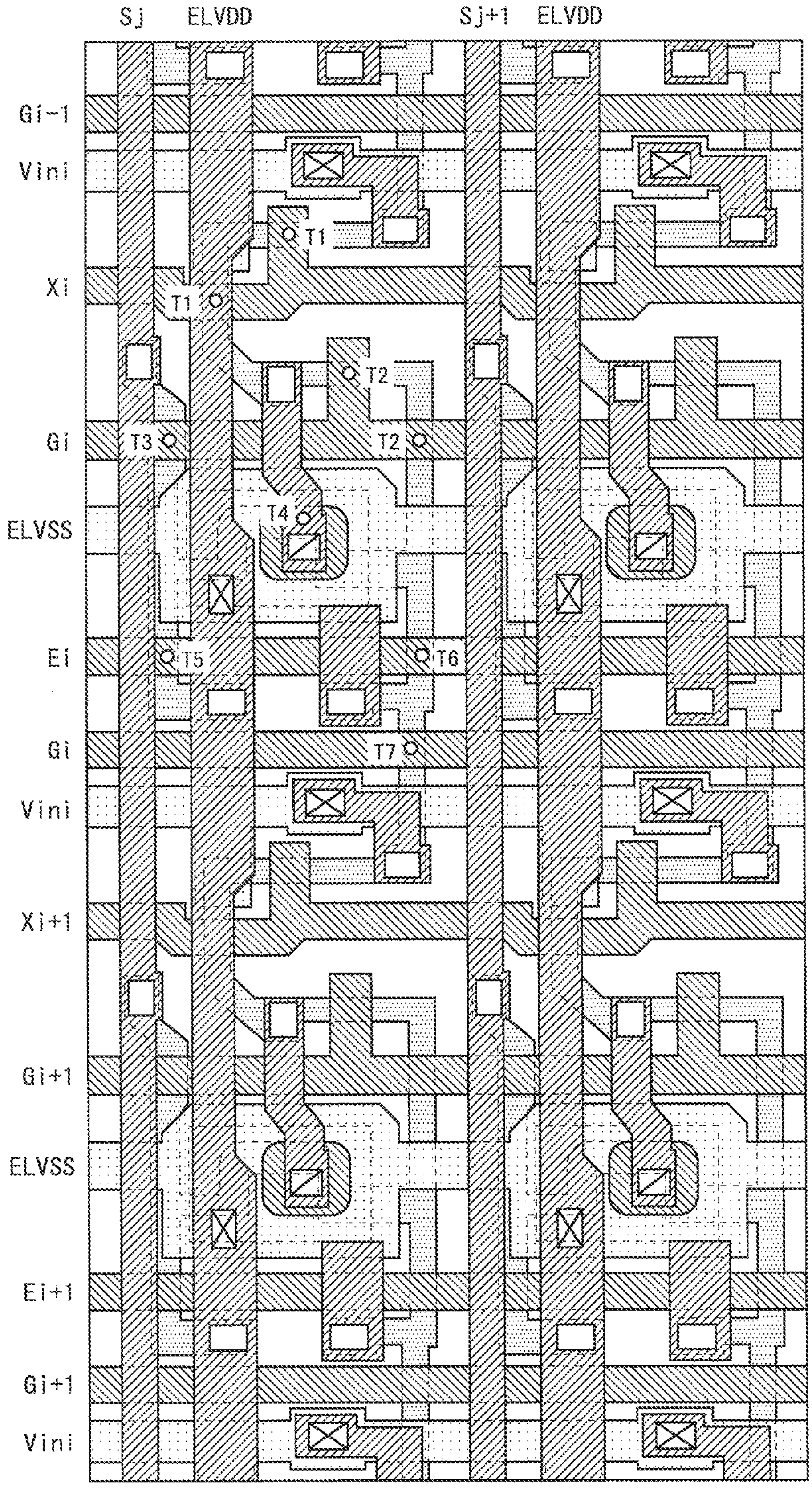
FIG. 9 is a layout diagram of a pixel circuit in an organic EL display device according to a second embodiment.
Figure 10:
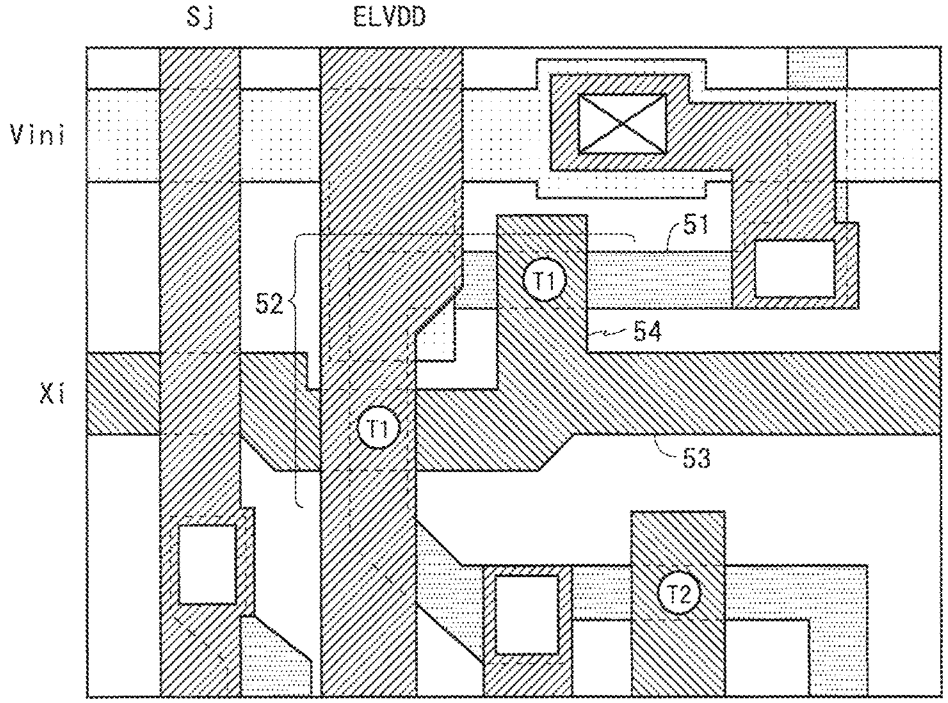
FIG. 10 is an enlarged view from FIG. 9.
Figure 11:
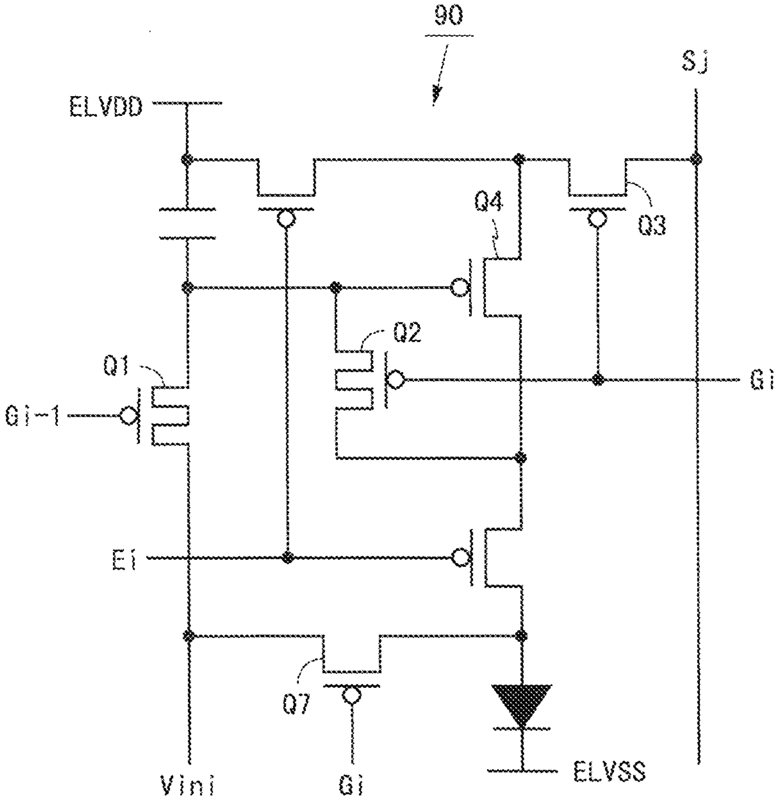
FIG. 11 is a circuit diagram of a pixel circuit in a known organic EL display device.

FIG. 9 is a layout diagram of the pixel circuit 20 in the organic EL display device according to the present embodiment. FIG. 10 is an enlarged view from FIG. 9. FIG. illustrates the layout of a portion surrounding the TFT T1. As shown in FIG. 10, the control line Xi has a main part 53 extending in the row direction but being bent at some points and a branch part 54 branching off the main part 53 in the column direction. The semiconductor layer pattern 51 has an L-shaped bent part 52 provided at the location where the TFT T1 is formed, and the bent part 52 crosses the main part 53 and the branch part 54 of the control line Xi. The portion of the main part 53 that crosses the bent part 52 and the portion of the branch part 54 that crosses the bent part 52 function as the gate electrodes of the TFT T1. In this manner, the TFT T1 has two gate electrodes formed at the locations where the main part 53 and the branch part 54 cross the bent part 52.

As described above, in the organic EL display device according to the present embodiment, the control line Xi has the main part 53 extending in a predetermined direction (row direction) and the branch part 54 branching off the main part 53. The semiconductor layer of the initialization transistor (i.e., the portion of the semiconductor layer pattern 51 that coincides with the location of the TFT T1) has the L-shaped bent part 52 crossing the main part 53 and the branch part 54. The initialization transistor (TFT T1) has the two gate electrodes formed at the locations where the main part 53 and the branch part 54 cross the bent part 52 (FIG. 10). Thus, the initialization transistor can be formed so as to have two gate terminals.

As with the organic EL display device according to the first embodiment, the organic EL display device according to the present embodiment renders it possible to initialize voltages at the control terminals of the drive transistors (the gate voltages of the TFTs T1) and thereby readily display a screen upside down.

While the display devices that include pixel circuits incorporating light-emitting elements have been described, taking as examples some organic EL display devices that include pixel circuits incorporating organic EL elements (organic light-emitting diodes), inorganic EL display devices that include pixel circuits incorporating inorganic light-emitting diodes, QLED (quantum-dot light-emitting diode) display devices that include pixel circuits incorporating quantum-dot light-emitting diodes, and LED display devices that include pixel circuits incorporating mini or micro LEDs may be configured similarly to the display devices described above. Moreover, display devices with combined features of the above embodiments and variants may be configured by arbitrarily combining the features of the display devices described above without contradicting the nature of such combined features.

DESCRIPTION OF THE REFERENCE CHARACTERS

10 organic EL display device
11 display portion
12 display control circuit
13 scanning line driver circuit
14 data line driver circuit
15 emission control line driver circuit
20 pixel circuit
31 first wiring line
32 second wiring line
41, 51 semiconductor layer pattern
42, 52 bent part
53 main part
54 branch part

The invention claimed is:

1. A display device comprising:

a display portion including a plurality of scanning lines, a plurality of control lines, a plurality of data lines, and a plurality of pixel circuits;

a scanning line driver circuit configured to drive the scanning lines and the control lines; and a data line driver circuit configured to drive the data lines, wherein, each of the pixel circuits includes:

a light-emitting element;

a drive transistor provided in series with the light-emitting element to control an amount of current flowing through the light-emitting element;

a write control transistor provided between one of the data lines and a first conductive terminal of the drive transistor and having a control terminal connected to one of the scanning lines;

a threshold compensation transistor provided between the drive transistor's control terminal and second conductive terminal and having a control terminal connected to the one of the scanning lines; and an initialization transistor having a first conductive terminal connected to the control terminal of the drive transistor, a second conductive terminal to which an initialization voltage is applied, and a control terminal connected to one of the control lines, the scanning line driver circuit selectively performs an operation of selecting the scanning lines in a predetermined order and an operation of selecting the scanning lines in a reverse order and, for each scanning line, selects the control line that corresponds to the each scanning line one horizontal period before the selection of the each scanning line, the each of the pixel circuits further includes a second initialization transistor having a first conductive terminal connected to an anode terminal of the light-emitting element, a second conductive terminal to which the initialization voltage is applied, and a control terminal connected to the one of the scanning lines, the one of the scanning lines branches into first and second wiring lines in the display portion, the first wiring line is connected to the control terminal of the write control transistor and the control terminal of the threshold compensation transistor, and the second wiring line is connected to the control terminal of the second initialization transistor.

2. The display device according to claim 1, wherein the initialization transistor has two gate terminals serving as the control terminal.

3. The display device according to claim 2, wherein, the control lines extend in a predetermined direction, the initialization transistor includes a semiconductor layer having a U-shaped bent part crossing the one of the control lines at two locations, and the initialization transistor has two gate electrodes formed at the locations where the one of the control lines and the bent part cross each other.

4. The display device according to claim 2, wherein, the one of the control lines has a main part extending in a predetermined direction and a branch part branching off the main part, the initialization transistor includes a semiconductor layer having an L-shaped bent part crossing the main part and the branch part, and the initialization transistor has two gate electrodes formed at locations where the main part and the branch part cross the bent part.

5. The display device according to claim 1, wherein, the display portion further includes a plurality of emission control lines, and the each of the pixel circuits further includes one or more emission control transistors provided on a current path passing by way of the drive transistor and the light-emitting element, each emission control transistor having a control terminal connected to one of the emission control lines.

6. The display device according to claim 1, wherein the light-emitting element is an organic electro-luminescent element.

7. A method for driving a display device having a display portion that includes a plurality of scanning lines, a plurality of control lines, a plurality of data lines, and a plurality of pixel circuits, wherein each of the pixel circuits includes a light-emitting element, a drive transistor provided in series with the light-emitting element to control an amount of current flowing through the light-emitting element, a write control transistor provided between one of the data lines and a first conductive terminal of the drive transistor and having a control terminal connected to one of the scanning lines, a threshold compensation transistor provided between the drive transistor's control terminal and second conductive terminal and having a control terminal connected to the one of the scanning lines, and an initialization transistor having a first conductive terminal connected to the control terminal of the drive transistor, a second conductive terminal to which an initialization voltage is applied, and a control terminal connected to one of the control lines, and the method comprises:

selectively performing an operation of selecting the scanning lines in a predetermined order and an operation of selecting the scanning lines in a reverse order;

for each scanning line, selecting the control line that corresponds to the each scanning line one horizontal period before the selection of the each scanning line; and driving the data lines, the each of the pixel circuits further includes a second initialization transistor having a first conductive terminal connected to an anode terminal of the light-emitting element, a second conductive terminal to which the initialization voltage is applied, and a control terminal connected to the one of the scanning lines, the one of the scanning lines branches into first and second wiring lines in the display portion, the first wiring line is connected to the control terminal of the write control transistor and the control terminal of the threshold compensation transistor, and the second wiring line is connected to the control terminal of the second initialization transistor.

8. The method according to claim 7, wherein the initialization transistor has two gate terminals serving as the control terminal.

9. The method according to claim 8, wherein, the control lines extend in a predetermined direction, the initialization transistor includes a semiconductor layer having a U-shaped bent part crossing the one of the control lines at two locations, and the initialization transistor has two gate electrodes formed at the locations where the one of the control lines and the bent part cross each other.

10. The method according to claim 8, wherein, the one of the control lines has a main part extending in a predetermined direction and a branch part branching off the main part, the initialization transistor includes a semiconductor layer having an L-shaped bent part crossing the main part and the branch part, and the initialization transistor has two gate electrodes formed at locations where the main part and the branch part cross the bent part.

11. The method according to claim 7, wherein, the display portion further includes a plurality of emission control lines, and the each of the pixel circuits further includes one or more emission control transistors provided on a current path passing by way of the drive transistor and the light-emitting element, each emission control transistor having a control terminal connected to one of the emission control lines.

12. The method according to claim 7, wherein the light-emitting element is an organic electro-luminescent element.

* * * * *